US009470148B2

(12) United States Patent
Perryman, Jr.

(10) Patent No.: US 9,470,148 B2
(45) Date of Patent: Oct. 18, 2016

(54) NON-COMBUSTION ENERGY SOURCE AND CONFIGURATION FOR BRAYTON CYCLE HEAT ENGINES

(76) Inventor: Virgil Dewitt Perryman, Jr., Sterrett, AL (US)

(*) Notice: Subject to any disclaimer, the term of this patent is extended or adjusted under 35 U.S.C. 154(b) by 1156 days.

(21) Appl. No.: 13/425,834

(22) Filed: Mar. 21, 2012

(65) Prior Publication Data
US 2013/0247585 A1 Sep. 26, 2013

(51) Int. Cl.
F02C 7/08 (2006.01)
F23R 3/00 (2006.01)
F02C 3/14 (2006.01)
F23M 9/06 (2006.01)
F23R 3/04 (2006.01)
F23R 3/16 (2006.01)
F23C 7/08 (2006.01)
F23R 3/46 (2006.01)
F23R 3/50 (2006.01)

(52) U.S. Cl.
CPC . F02C 7/08 (2013.01); F02C 3/14 (2013.01); F23C 7/08 (2013.01); F23M 9/06 (2013.01); F23R 3/005 (2013.01); F23R 3/04 (2013.01); F23R 3/16 (2013.01); F23R 3/46 (2013.01); F23R 3/50 (2013.01); F05D 2250/25 (2013.01); Y02T 50/675 (2013.01)

(58) Field of Classification Search
CPC .............. F02C 3/14; F02C 1/04; F02C 1/05; F02C 7/08; F02C 7/10; F02C 7/105; F23R 3/002; F23R 3/005
See application file for complete search history.

(56) References Cited

U.S. PATENT DOCUMENTS 4,326,382 A * 4/1982 Baardson ........................ 60/655
2003/0163993 A1* 9/2003 Douglas .................... F02C 7/10
   60/772
2005/0086945 A1* 4/2005 Tiemann ......................... 60/800
2005/0126766 A1* 6/2005 Lee et al. ........................ 165/133
2010/0288571 A1* 11/2010 Dewis et al. .................. 180/165

FOREIGN PATENT DOCUMENTS

WO   WO99/09310   * 2/1999 ................ F02C 7/10

OTHER PUBLICATIONS

"3.1 Stationary Gas Turbines," Emission Factors: Stationary Internal Combustion Sources, http://www.epa.gov/ttnchie1/ap42/ch03/final/c03s01.pdf, (last accessed on Apr. 5, 2012).
Rabovitser et al., "1.3.3 Partial Oxidation Gas Turbine (POGT) Cycles," http://www.netl.doe.gov/technologies/coalpowerturbines/refshelf/handbook/1.3.3.pdf, (last accessed on Apr. 5, 2012).
Wikipedia Bubble Chamber Article, http://en.wikipedia.org/wiki/Bubble_chamber (last accessed on Apr. 5, 2012).

(Continued)

Primary Examiner — Andrew Nguyen
(74) Attorney, Agent, or Firm — LeonardPatel PC

(57) ABSTRACT

A Brayton cycle heat engine includes a compressor, a combustion chamber, and a turbine. The Brayton cycle heat engine also includes a heat exchanger positioned at least partially within the combustion chamber. The heat exchanger is configured to deliver thermal energy to the combustion chamber from an external source, heating air entering the combustion chamber from the compressor, where the air exits the combustion chamber and drives the turbine.

18 Claims, 15 Drawing Sheets

(56) References Cited

OTHER PUBLICATIONS

Wikipedia Combustor Article, http://en.wikipedia.org/wiki/Combustor (last accessed on Apr. 5, 2012).

Wikipedia Jet Engine Article, http://en.wikipedia.org/wiki/Jet_engine (last accessed on Mar. 16, 2012).

* cited by examiner

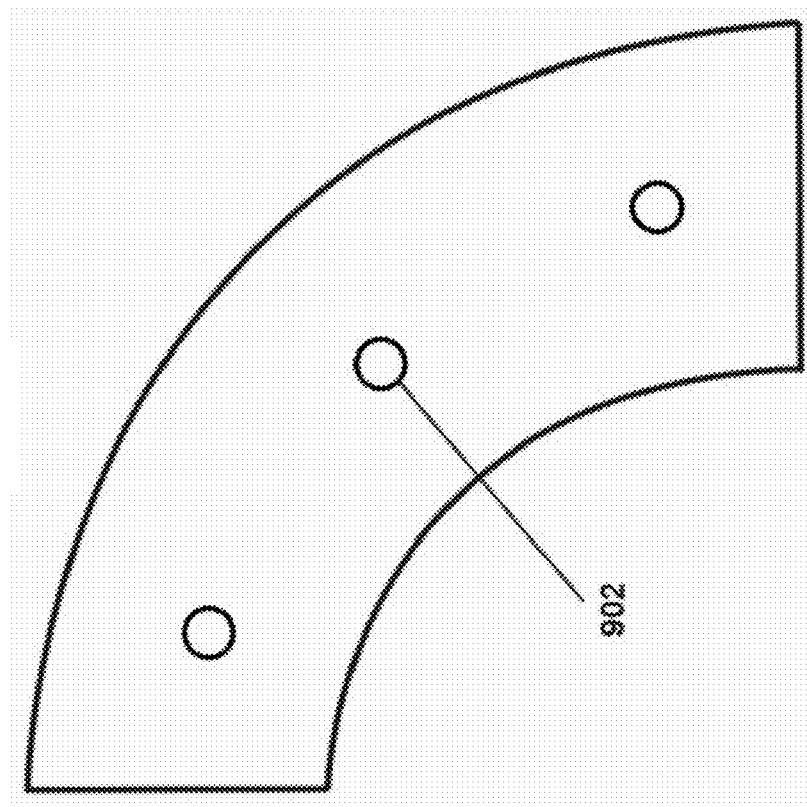

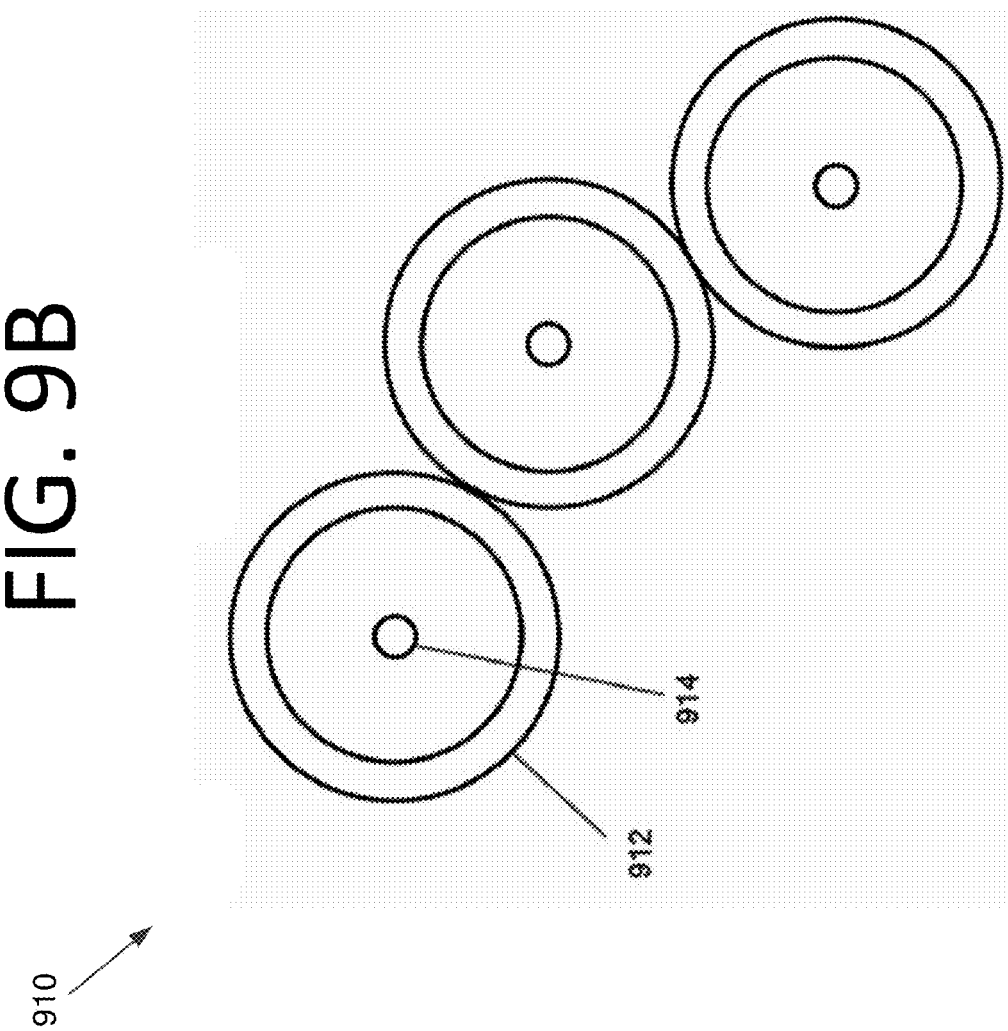

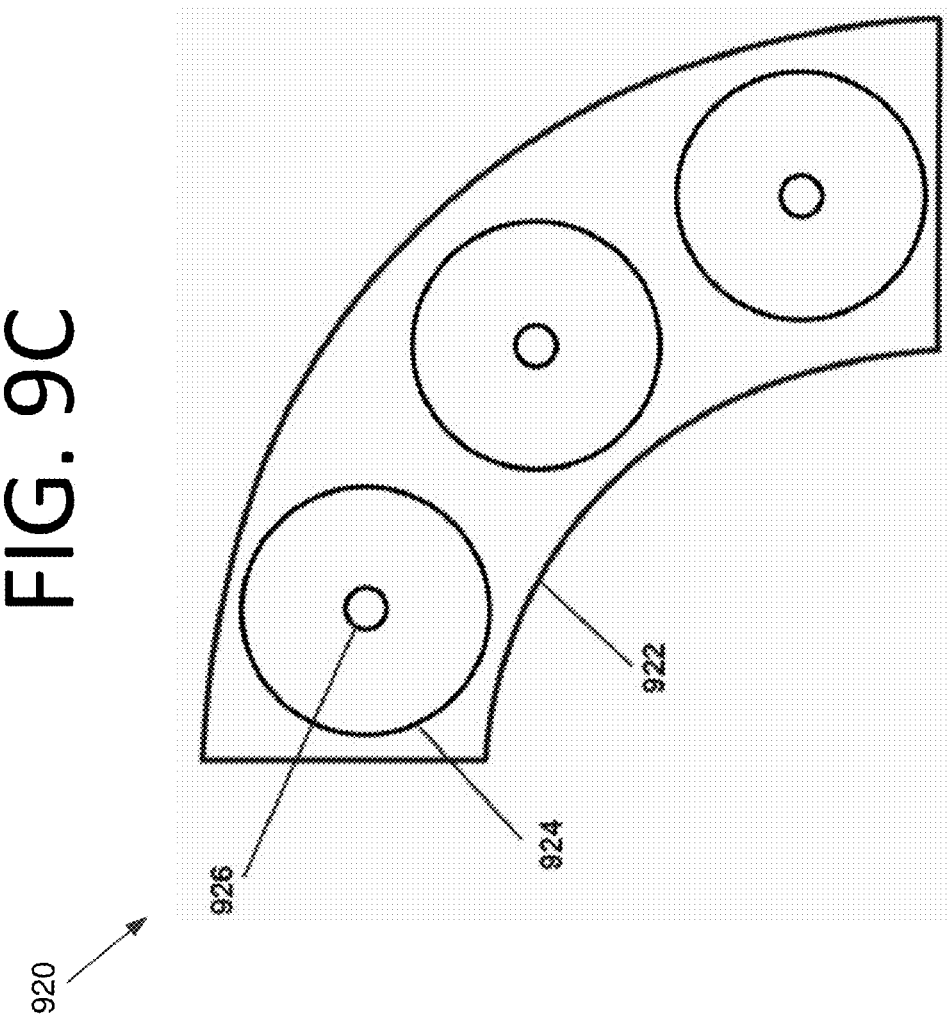

1000

NON-COMBUSTION ENERGY SOURCE AND CONFIGURATION FOR BRAYTON CYCLE HEAT ENGINES

FIELD

The present invention generally relates to Brayton cycle heat engines, and more specifically, to turbine engine configurations that at least partially use a heat exchanger as a power source.

BACKGROUND

The Brayton cycle turbine has traditionally been driven by energy provided in the form of combustion in a contained space, often referred to as a "combustion chamber." Compressed air is supplied by a compressor to the combustion chamber. Fuel is injected into the combustion chamber and ignited when combined with the compressed air. The rapidly expanding hot gases then pass through, and rotate, turbines before exiting through a nozzle.

The combustion of any hydrocarbon, whether gasoline, diesel, kerosene, natural gas, gasified coal, or biomass, has negative impacts on the environment to varying degrees in that various types of pollutants and large amounts of carbon are delivered in the exhaust gases. Also, combustion is not very efficient. It is estimated that the typical turbine may operate at less than 30% combustion efficiency, at best. Accordingly, a more efficient and clean Brayton cycle heat engine may be beneficial.

SUMMARY

Certain embodiments of the present invention may provide solutions to the problems and needs in the art that have not yet been fully identified, appreciated, or solved by current heat engine technologies. For example, some embodiments of the present invention use non-combustion-based thermal energy to supplement or replace combustible energy sources in a combustion chamber of a turbine engine.

In one embodiment, an apparatus includes a compressor, a combustion chamber, and a turbine. The apparatus also includes a heat exchanger positioned at least partially within the combustion chamber. The heat exchanger is configured to deliver thermal energy to the combustion chamber from an external source, heating air entering the combustion chamber from the compressor. The air exits the combustion chamber and drives the turbine.

In another embodiment, a Brayton cycle heat engine includes a compressor and a burner configured to receive compressed air from the compressor. The Brayton cycle heat engine also includes a turbine configured to receive hot air from the burner and a heat exchanger at least partially inserted into the burner. The heat exchanger is configured to heat air within the combustion chamber either alone or supplemental to a combustion-based heat source.

In yet another embodiment, a system includes a thermal energy source configured to generate thermal energy either directly or as a byproduct of another process. The system also includes a thermal transfer pipe and a manifold. The thermal transfer pipe includes a thermal transfer medium and the manifold includes a thermal transfer medium. The manifold is operably connected to the thermal transfer pipe. The system further includes a pipe that includes a thermal transfer medium operably connected to the manifold and a heat exchanger that includes a thermal transfer medium operably connected to the pipe. The heat exchanger is at least partially contained within a combustion chamber of a heat engine. The heat exchanger is configured to provide sufficient heat to either power the heat engine alone, or supplement power provided by a combustible fuel source.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 9A illustrates an annular burner as looking towards the turbine nozzle, as known in the art.

FIG. 9B illustrates can burners as looking towards the turbine nozzle, as known in the art.

FIG. 9C illustrates cannular burners as looking towards the turbine nozzle, as known in the art.

DETAILED DESCRIPTION OF THE EMBODIMENTS

Figure 1:
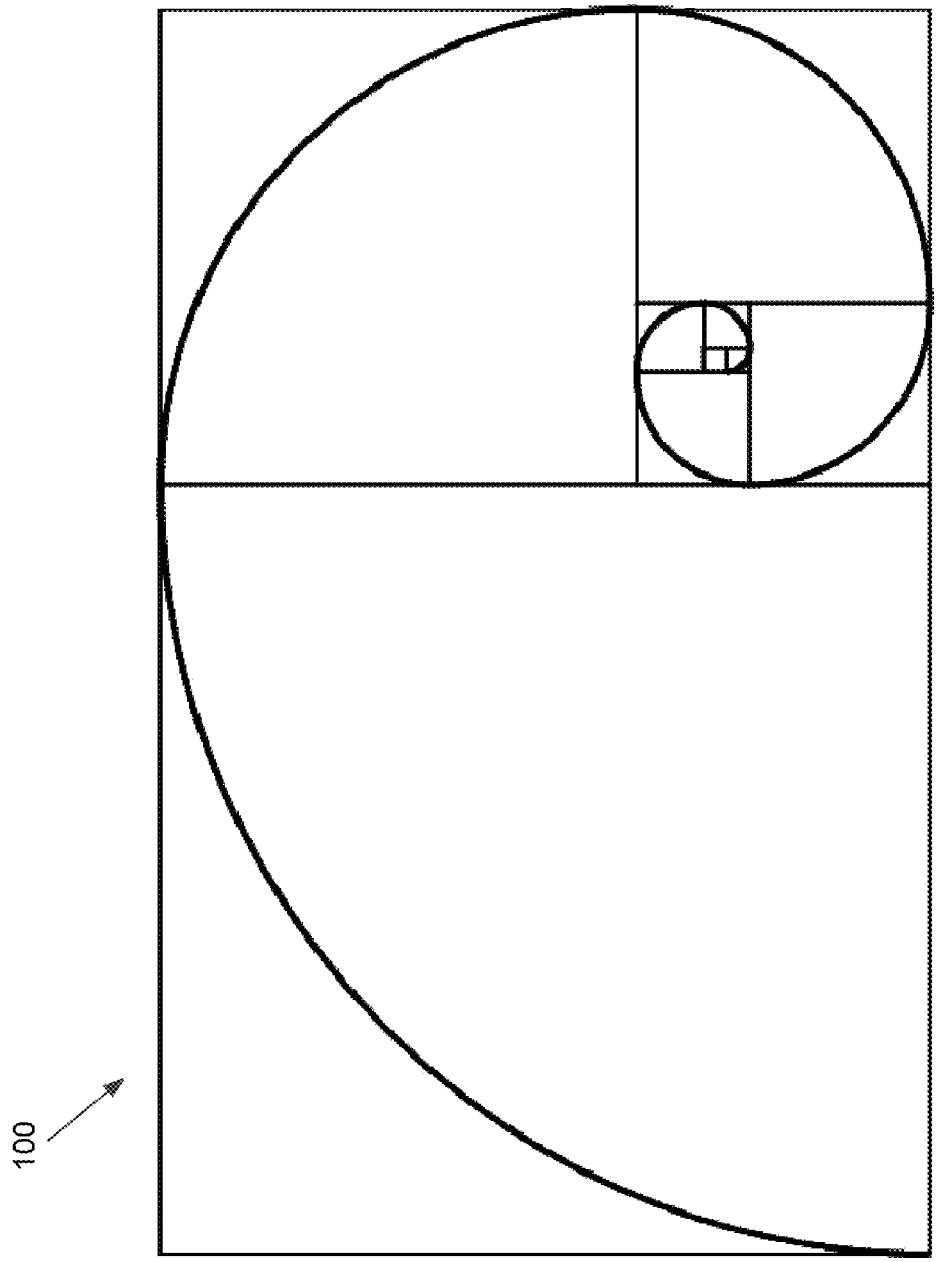
FIG. 1 illustrates the general path taken by compressed gas particles that are entering a combustion chamber.

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

As discussed above, "efficient" combustion-driven turbines are typically only capable of realizing an efficiency of around 30%. Giving the rising cost of, competition for, and ever-increasing scarcity of, fossil fuels and other hydrocarbon-based fuel sources, the potential economic implications of capturing and using an amount of energy that is closer to perfect combustion are enormous. Such a system could double or triple the efficiency of the conventional combustion-driven turbine.

However, in practice, combustion is never complete, and such efficiency gains have never been realized. There are always molecules that are far from the combustion source, compressed by the combustion, or deflected so that they are expelled from the combustion chamber as uncombusted hydrocarbons or partially combusted hydrocarbons. These factors contribute to the high degree of inefficiency of conventional forms of combustion. This inefficiency is not unique to gas turbines, and also occurs in internal combustion engines such those at many power plants, including most coal-fired power plants.

In order to provide more efficient power, some embodiments of the present invention supplement or replace combustion with an external thermal energy source, and deliver direct thermal energy to the combustion chamber of the turbine. While not discussed in detail here, thermal energy could also be applied to an internal combustion engine. Since the core mechanism that powers a Brayton cycle heat engine is heating compressed air so that rapidly expanding, high velocity exhaust gases turn the turbines and exit the nozzle, embodiments of the present invention uniquely apply at least some thermal energy from at least one non-hydrocarbon-based source between the compressor and turbines.

In some embodiments, a heat exchanger is placed between the compressor and the drive turbines of a Brayton cycle turbine engine. This heat exchanger may have an architecture that allows the optimal flow of air from the compressor to pass therethrough, and while passing through the heat exchanger, the air absorbs thermal energy from the heat exchanger. The thermal energy, once absorbed, causes the compressed gases to expand and rotate the aft turbines, which typically generate power in a turbine engine. In some embodiments, the thermal energy may be supplied by thermal energy extraction and/or storage systems such as those discussed in U.S. patent application Ser. Nos. 13/326,454, 13/361,877, and 13/417,133, the subject matter of which is incorporated herein by reference. While the terms "combustion chamber" and "burner" are discussed here with respect to where the thermal energy is applied, it is intended that these terms be applied to any chamber between the compressor and turbines where thermal energy is applied, regardless of whether any combustion actually takes place in such a chamber.

In some embodiments, the core of the heat exchanger serves as a thermal transfer medium and may be manufactured from PocoFoam®, or a similar graphite foam material. However, any suitable thermal transfer medium, such as copper or aluminum, may be used as a matter of design choice in certain embodiments. In many embodiments, the thermal transfer medium is a solid state thermal transfer medium. The core of the heat exchanger may be shaped in a manner that conforms to the outer shape of the heat exchanger. Generally, it is desirable for the outer surface of the heat exchanger to have a relatively large surface area and come into contact with as much of the air from the compressor as possible. The core of the heat exchanger may have a boron nitride (BN) nano sphere packing, allowing sufficient clearance for contraction and expansion of a cover without losing thermal conductivity. However, any suitable material may be used. In some embodiments, the cover may be metal or any other suitable material.

A piping structure may have layers of refractory and insulating materials that would encase the thermal transfer medium of the core. This piping structure may connect the thermal transfer medium to a heat source that could be a solar collector, a thermal storage unit, another heat exchanger (such as at a power plant, steel foundry, or glass plant), or almost any other high temperature thermal source. The piping structure may also directly connect to a turbine combustion chamber to provide energy to the turbine engine.

In some embodiments, it is preferable to have a thermal storage unit that can buffer the yearly irregularity of various changes in temperature and availability of the thermal source, whether the thermal source is solar or other high temperature sources. A series of switches may operate by opening and closing using the characteristics of expansion or contraction of various metals and ceramics to move components constructed out of PocoFoam® or similar graphite foam materials, and the system may be totally encased to create a gas-tight environment to encase an inert gas, thus preventing the danger of deterioration due to oxidation, or disassociation of the carbon foam in carbon foam embodiments at operational temperatures of the system.

In designing a heat exchanger for use in a turbine, it may be beneficial to consider the motion of compressed gas that is being forced into the combustion chamber. If the object of the heat exchanger design is to provide the optimal surface for the molecules of the gas to collect thermal energy, as is the case in some embodiments of the present invention, it is important to understand the motion of the gas particles and how to design a heat exchanger that will take advantage of this innate motion at the atomic scale. FIG. 1 illustrates the general path 100 taken by compressed gas particles that are entering a combustion chamber. As can be seen, path 100 is a Fibonacci spiral.

The goal of the heat exchanger design in some embodiments is to optimize the flow of air passing around and/or through the heat exchanger while at the same time trying to harmonize with the normal pattern of the atomic, subatomic, and molecular particles that make up the passing gas. Such a design may change based on the type and configuration of the turbine.

Figure 2:
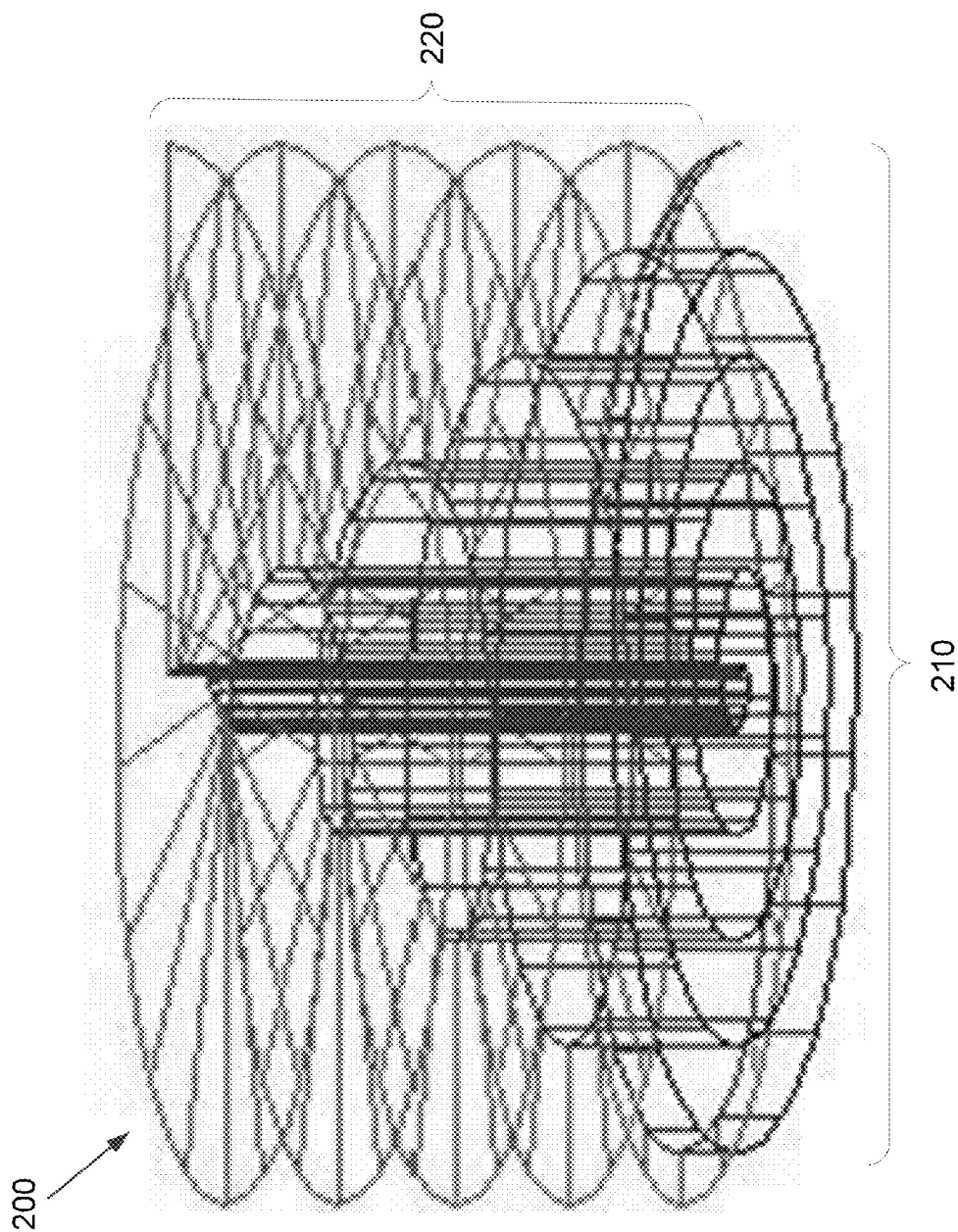
FIG. 2 illustrates air flow in a theoretical heat exchanger system, according to an embodiment of the present invention.

In some embodiments, the heat exchanger may take the form of an Archimedes spiral. FIG. 2 illustrates air flow in a theoretical heat exchanger system 200, according to an embodiment of the present invention. Archimedes spiral heat exchanger 210 incorporates aspects of the Fibonacci spiral in that the vector on the peripheral edge is constrained, forming a spiral shape that generally forces linear motion by the gas in moving around the shape. It would generally be impossible to pass through Archimedes spiral heat exchanger 210 without such motion. Compressed cooler air enters Archimedes spiral heat exchanger 210 from a compressor (not shown). As the compressed cooler air passes through Archimedes spiral heat exchanger 210, the air is rapidly heated, and moves in a Fibonacci spiral pattern 220. The swirling hot air contacts turbines (not shown) and rotates the turbines, generating power for the heat engine.

However, one issue with a flat implementation is that a production design would likely be more effective when a thermal transfer medium is built into the heat exchanger. A variation on this general shape, similar to the grooves of many bolts and screws, may be easy to mass produce using a variety of metals and other materials, particularly high temperature alloys capable of operation in the high temperature environment of a combustion chamber in a gas turbine.

Figure 3:
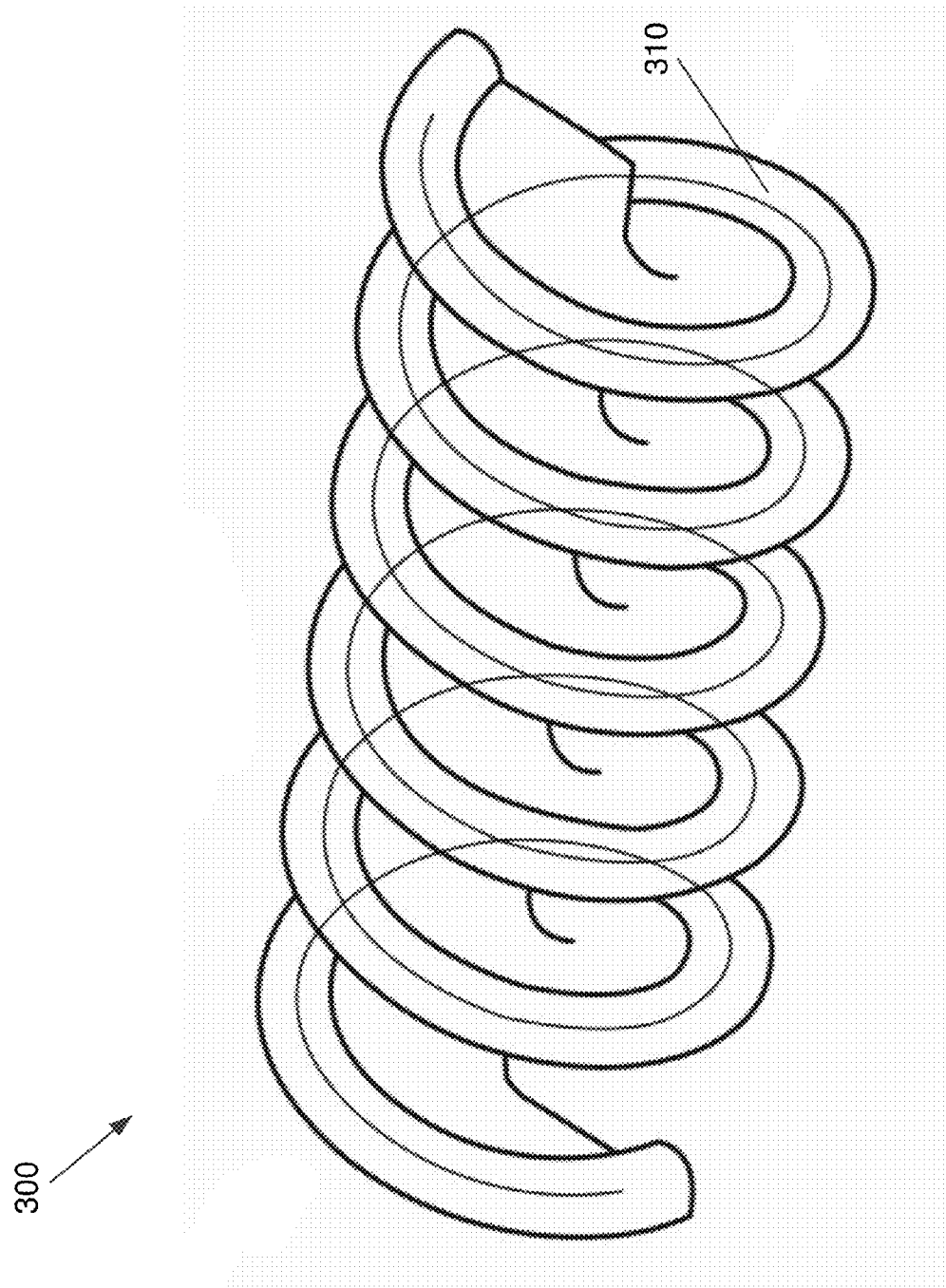
FIG. 3 is a mechanical drawing of an Archimedes spiral heat exchanger with an incorporated thermal transfer medium, according to an embodiment of the present invention.

FIG. 3 is a mechanical drawing of an Archimedes spiral heat exchanger 300 with an incorporated thermal transfer medium, according to an embodiment of the present invention. Archimedes spiral heat exchanger 300 shows an adaptation of Archimedes spiral heat exchanger 210 of FIG. 2. The spiral in this embodiment has a hollow tube 310 adjoined to its peripheral edge. It is possible to mold this spiral shape, calculate the probable shrinkage of a thermal transfer medium such as PocoFoam®, mold the thermal transfer medium, and after firing, twist the shape of the thermal transfer medium into its tubular housing after the housing has been liberally coated with a suitable material such as boron nitride (BN) to accommodate differences in expansion and contraction between the thermal transfer medium and the material from which the outside, or "shell", of Archimedes spiral heat exchanger 300 is crafted. If the structure were manufactured from a material such as nickel, which has good thermal transfer characteristics, the entire structure would be available, in terms of surface area, to transfer thermal energy to the gas as it circulates through the combustion chamber.

Figure 4:
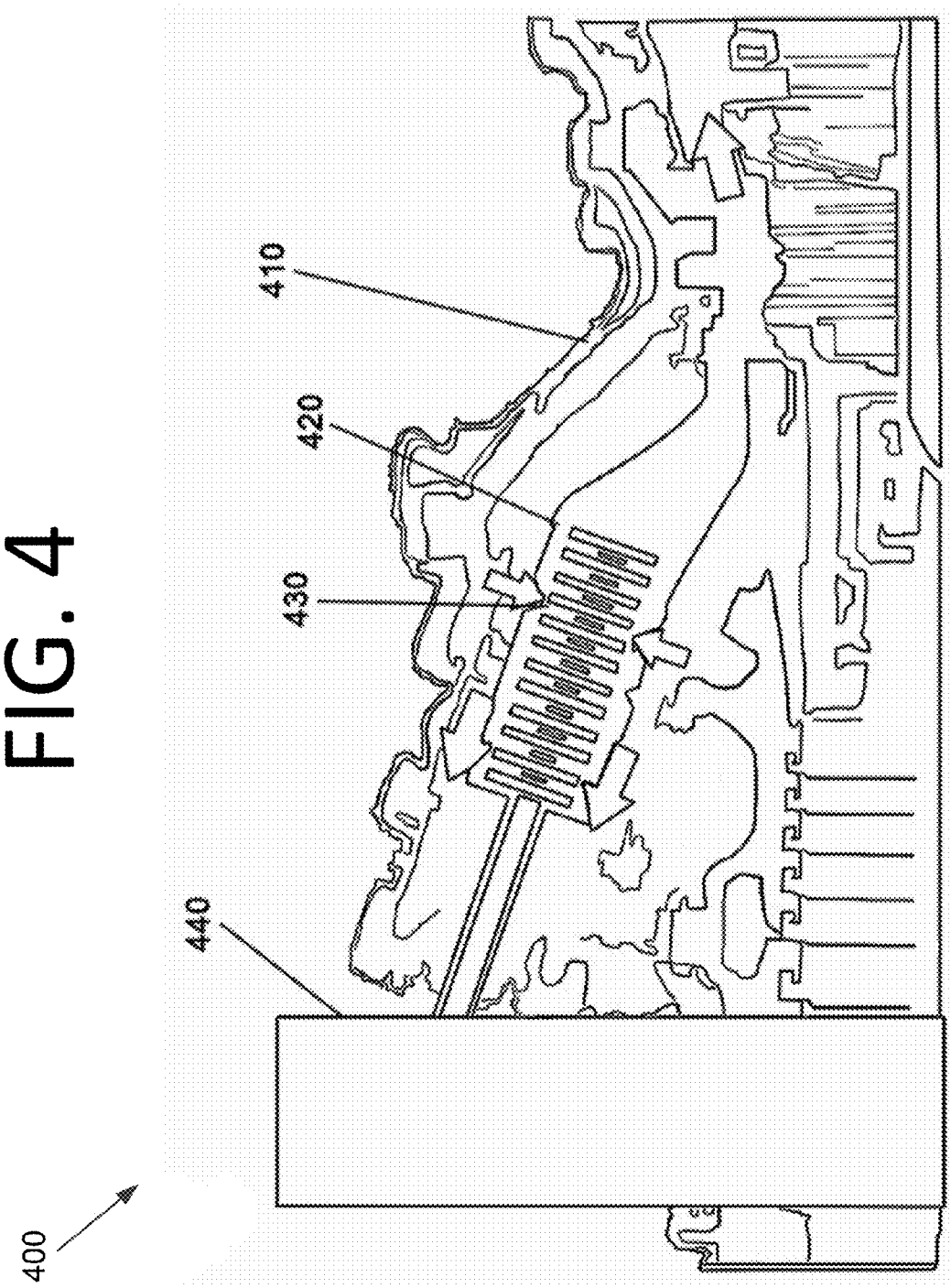
FIG. 4 illustrates a side cutaway view of a canister-based turbine system, according to an embodiment of the present invention.

There are many different types of turbines having many combustion chamber configurations, all of which may be modified by various embodiments of the present invention. For instance, there are annular, can (i.e., "canister"), cannular, and double annular combustors, among others. In turbines where canisters are present, a single manifold may connect to a plurality of heat exchangers that are located in each canister. In FIG. 4, a canister-based turbine system 400 is shown. System 400 includes a turbine engine 410 that may have a plurality of canisters, although only a single canister 420 is visible. In some other embodiments, only a single canister is present, as is the case for certain Kawasaki® turbines, for example. A heat exchanger 430 resides within canister 420. In some embodiments, heat exchanger 430 may have a spiral shape similar to that shown in FIGS. 2 and 3, although any suitable shape may be used as a matter of design choice. A manifold 440 connects to the heat exchangers in turbine engine 410, such as heat exchanger 430. In some embodiments, manifold 440 may integrate the heat exchangers into a central delivery system that allows thermal energy to be evenly distributed. Some embodiments may have an annular reverse flow adaptation that is common in the most advanced GE® turbines, for example.

In some embodiments, rather than providing thermal energy to turbine engine 410, thermal energy may be extracted from turbine engine 410 when it is operated by another power source such as a combustible fuel. Thus, the system may work both ways for thermal transfer. However, this would take power away from turbine 410 and reduce the rotation speed of the turbines. Where thermal energy is to be extracted from the system, a more optimal configuration is to have a separate system of heat exchangers located in the exhaust stream of the nozzle of turbine engine 410.

Accordingly, in some embodiments, another heat exchanger may be configured to collect a large amount of the thermal energy exhausted from the primary cycle of a heat engine. This energy could, in turn, be used in a smaller turbine or supplemented and used in a turbine of equal size.

In various configurations, the efficiency of the system could be manipulated to obtain near the theoretical optimal. The economics of such a system may logically be attractive as a larger fraction of the energy is utilized without the inefficiencies of using the Kalina Cycle or the Rankin Cycle, or the loses of converting the energy in the gas to steam for use in a steam turbine.

Heat exchangers in some embodiments of the present invention may operate at temperatures in excess of 2600° C., and may harvest as much as 80% of the energy when operating at temperatures over 1000° C. A second stage heat exchanger may be used to collect much of the usable balance. Including a thermal storage unit in the loop could supplement the necessary energy for each stage. The turbine could operate at a lower power using such a supplemental source.

In certain embodiments, a thermal absorption unit may be used for many applications, such as chilling the air that is coming into the compressor inlet of the turbine. The cooler air is denser and it requires less energy for the compressor to operate than warmer air, thus increasing the overall efficiency of the system. This is particularly beneficial in warmer climates.

The thermal absorption unit may be self-contained, and may use thermal energy to operate. The thermal absorption unit may operate on the delta between 180° C. and 80° C., but hotter energy may be used with some blending. As such, some embodiments may nearly totally use the energy delivered to the turbine. As a beneficial byproduct, the thermal absorption unit may produce significant quantities of distilled water, which is also particularly beneficial in warmer climates such as California.

Figure 5:
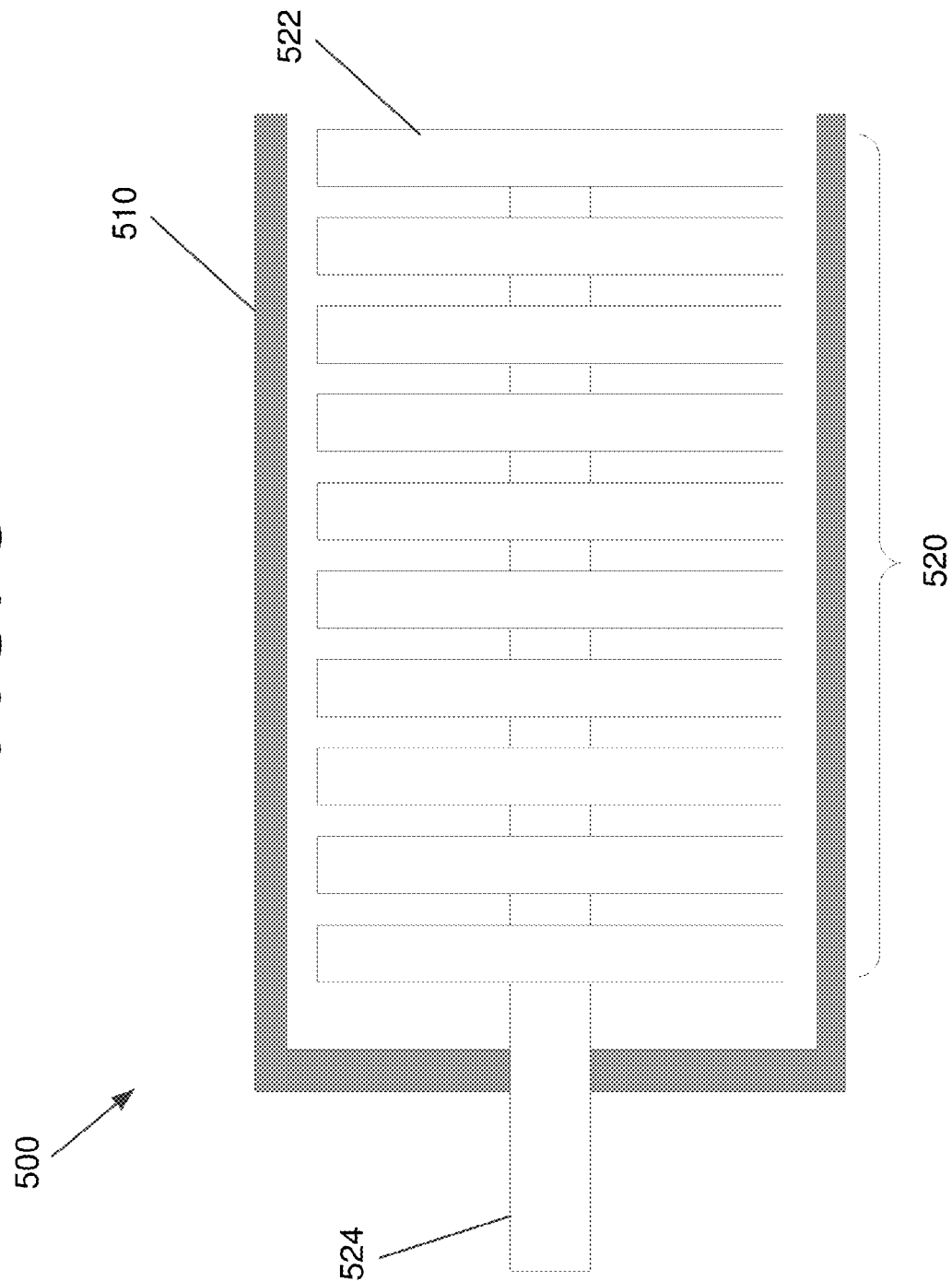
FIG. 5 illustrates a system having a canister and a heat exchanger nested within the canister, according to an embodiment of the present invention.

FIG. 5 illustrates a system 500 having a canister 510 and a heat exchanger 520 nested within canister 510, according to an embodiment of the present invention. Heat exchanger 520 has a series of spiral edges 522, although in other embodiments, other shapes may be used, such as a single solid piece or any other geometric shape. However, configurations such as those illustrated in FIGS. 2-5 may have superior performance and thermal transfer characteristics over other configurations.

A pipe 524 containing a thermal transfer medium (not shown) delivers thermal energy to system 500. Depending on the design, two ends of a tube on the peripheral edge of spiral edges 522 containing a thermal transfer medium may connect to the thermal transfer medium in pipe 524 and receive thermal energy, other spirals may contain a thermal transfer medium, none of the spirals may contain a thermal transfer medium (for instance, the heat is transferred from the thermal transfer medium to the material of the spiral), or any other suitable configuration may be used as a matter of design choice.

Figure 6:
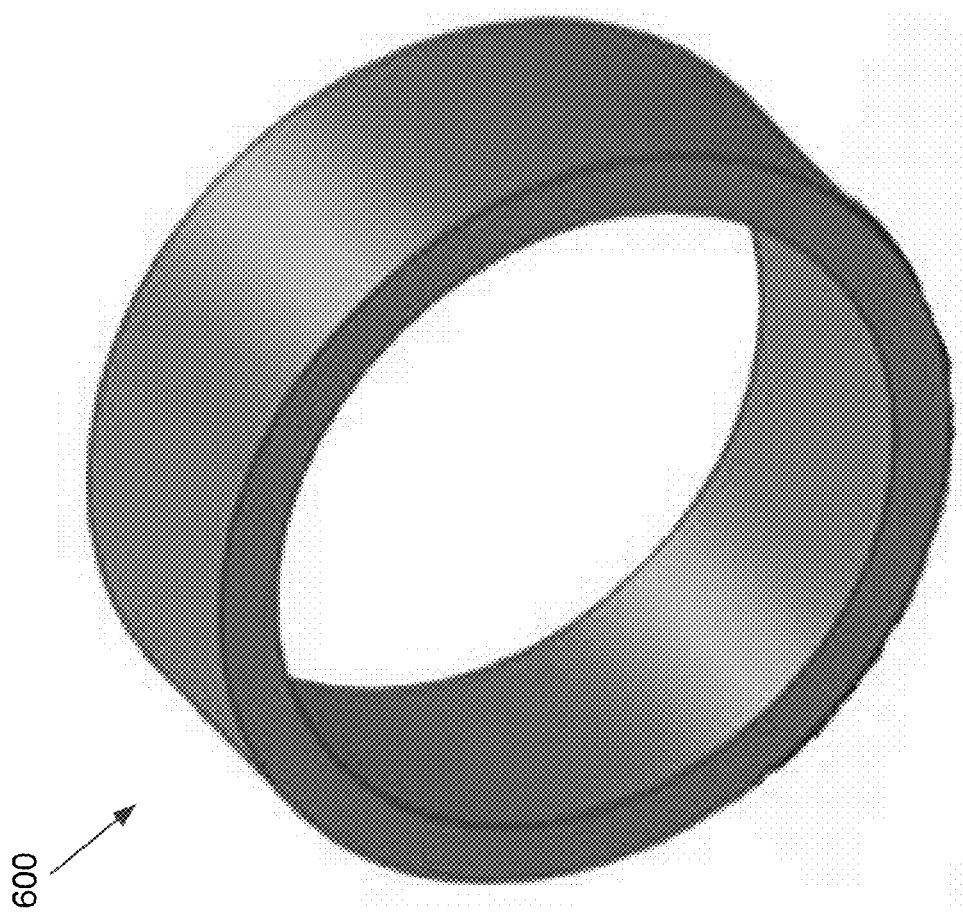
FIG. 6 illustrates a manifold, according to an embodiment of the present invention.

FIG. 6 illustrates a manifold 600, according to an embodiment of the present invention. Manifold 600 contains a thermal transfer medium (not shown) and connects to both one or more pipes of one or more heat exchangers, and one or more pipes providing an external supply of thermal energy. In FIG. 6, manifold 600 has a ring shape, but may be any desired shape so as to effectively integrate with a given turbine engine. For ease of manufacturing and/or installation, manifold 600 may be composed of multiple sections of any desired shape, or multiple shapes, that are bolted, welded, or otherwise attached together. This may also facilitate easier disassembly of manifold 600 for maintenance or transportation to another location.

Figure 7:
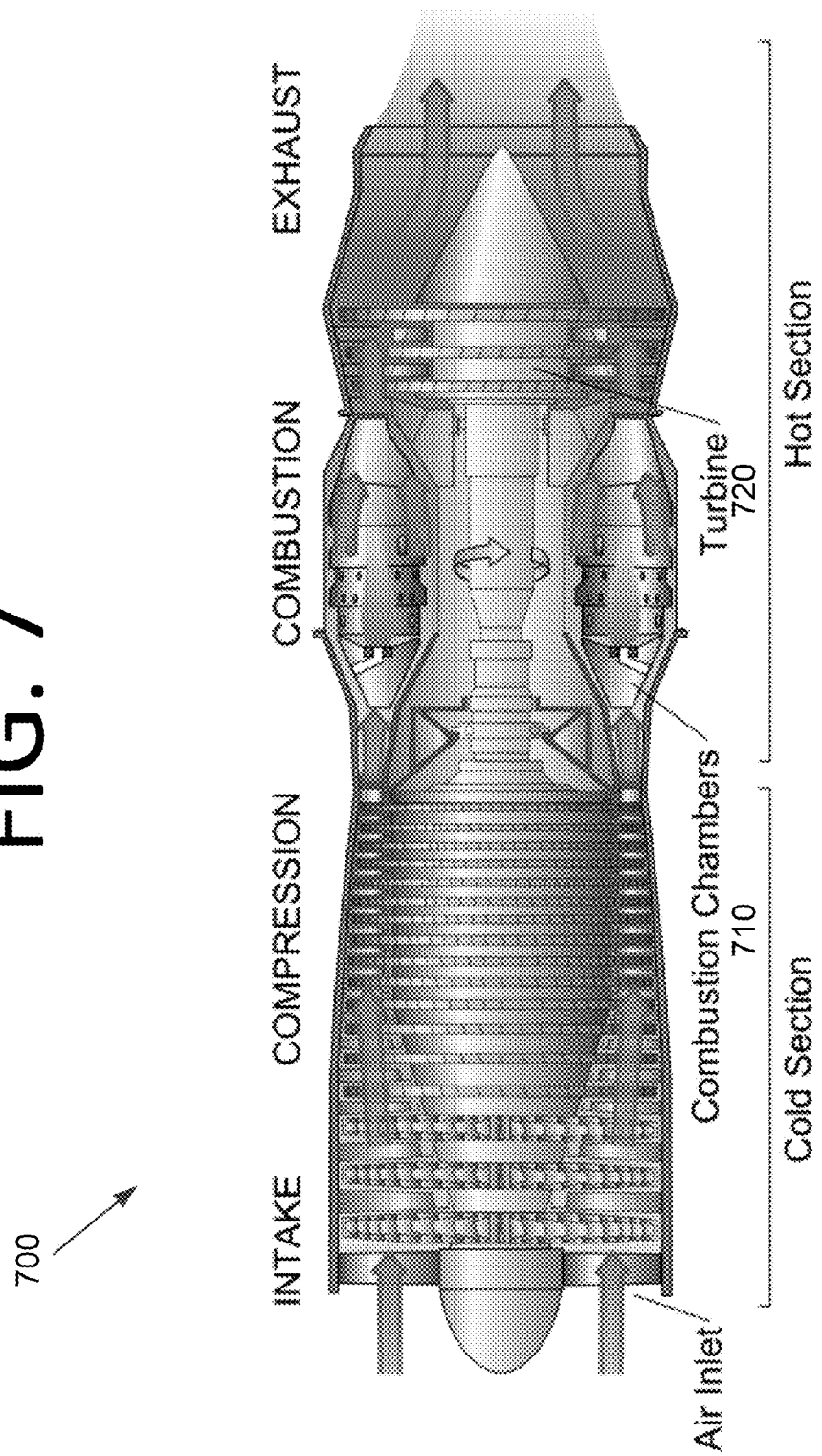
FIG. 7 illustrates a gas turbine, as known in the art.

To show the end-to-end operation of a typical turbine engine, FIG. 7 illustrates a gas turbine 700. Gas turbine 700 compresses cold air and delivers the compressed air to combustion chambers 710. Some heating of the air takes place during compression. In combustion chambers 710, the compressed air is rapidly heated further when exposed to thermal energy from combusted fuel. The hot air then rapidly exits combustion chambers 710 and contacts and rotates turbines 720. After rotating turbines 720, the hot air exits the nozzle of gas turbine 700.

Figure 8:
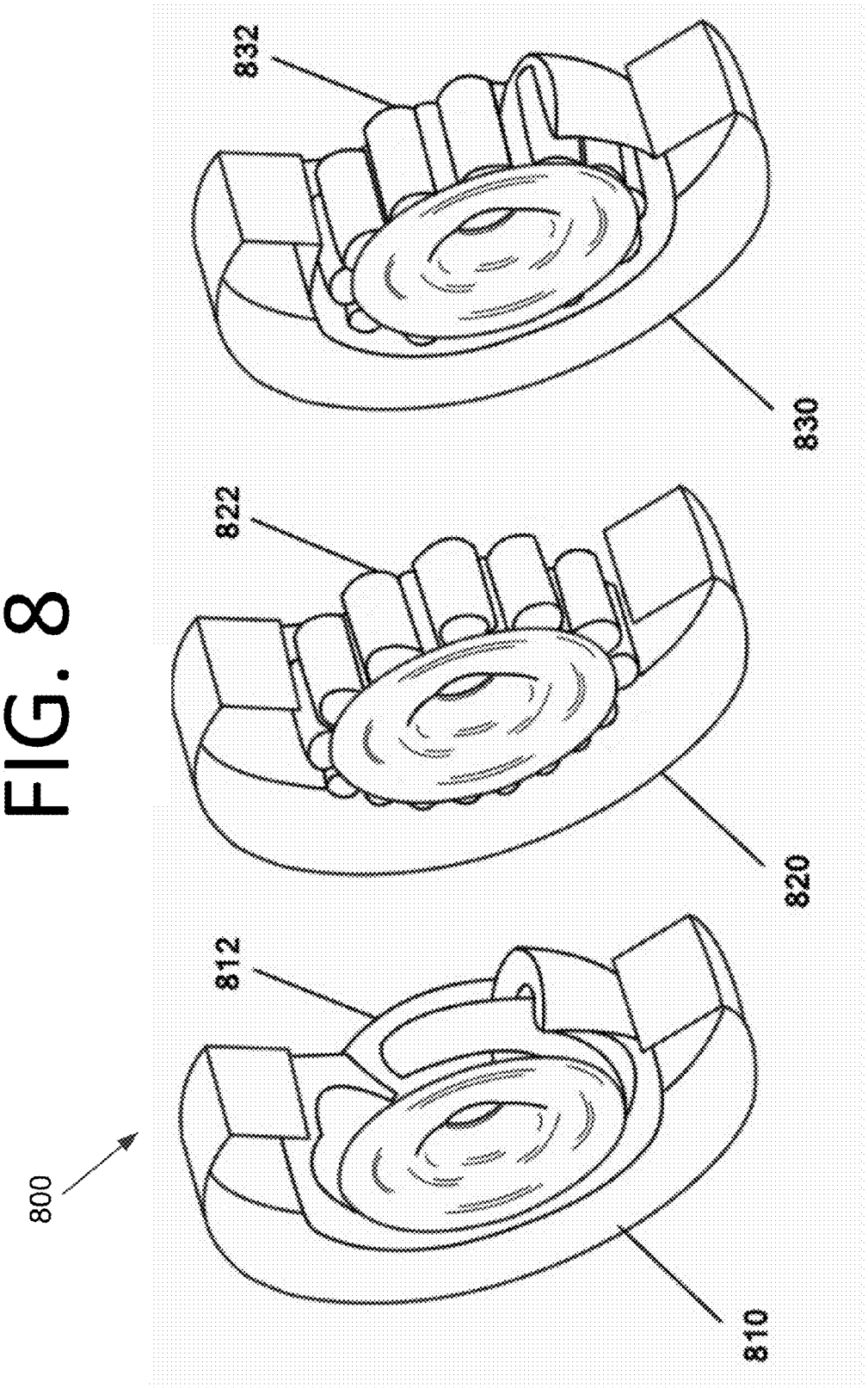
FIG. 8 illustrates several burner configurations, as known in the art.

Per the above, burners in a combustion chamber may have a variety of configurations. FIG. 8 illustrates several burner configurations 800, as are known in the art. An annular burner 810 has a ring 812 where combustion takes place. Can burners 820 have a series of cans 822, and combustion takes place inside of each can. Can-annular, or "cannular", burners 830 combine the features of an annular burner and can burners, having a ring-and-can configuration 832. These principles are better illustrated and discussed in more detail with respect to FIGS. 9A-C.

Figure 10:
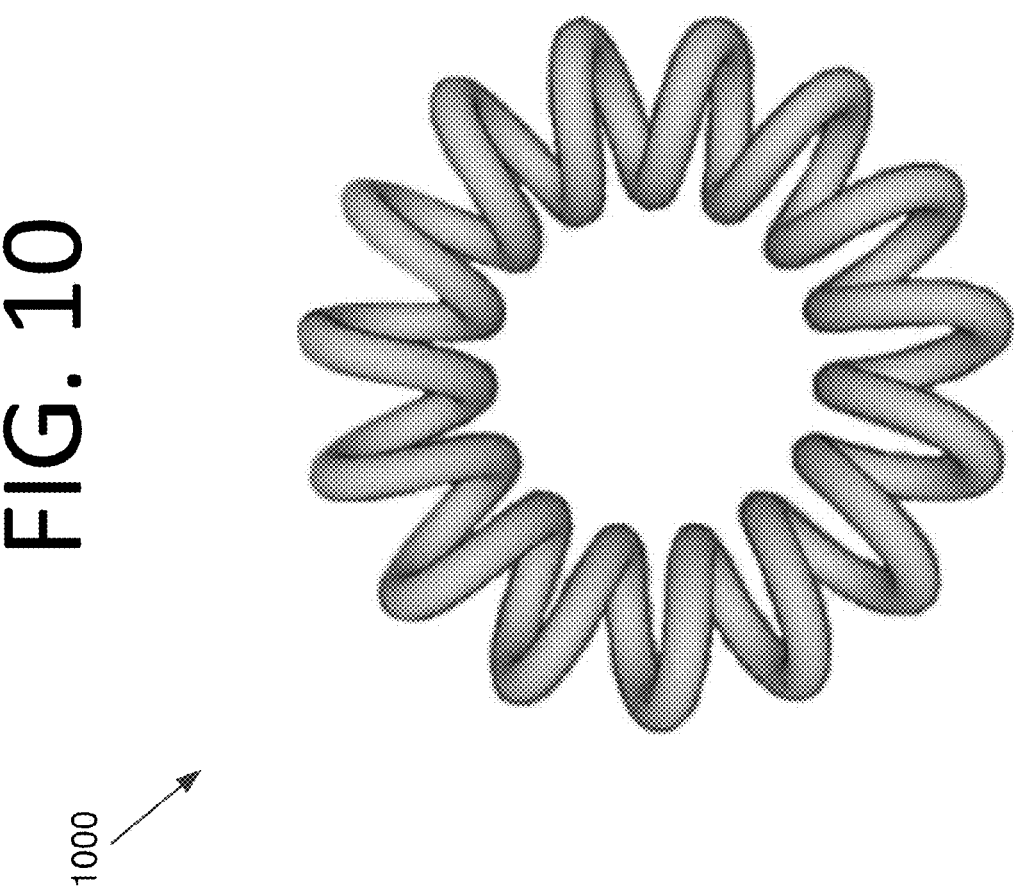
FIG. 10 illustrates a ring heat exchanger, according to an embodiment of the present invention.

FIG. 9A illustrates an annular burner 900 as looking towards the turbine nozzle, as known in the art. Annular burner 900 has multiple fuel injection nozzles 902. Annular combustors do away with the separate combustion zones, such as are present in can and cannular combustors, and have a continuous liner and casing in a ring (i.e., the annulus). Some embodiments of the present invention incorporate a ring-shaped heat exchanger to fit this shape, and may further have a spiral pattern as illustrated in FIG. 10.

There are many advantages to annular combustors, including more uniform combustion, shorter size (therefore lighter weight), and less surface area. Additionally, annular combustors tend to have uniform exit temperatures. They also generally have the lowest pressure drop of the three designs (on the order of 5%). The annular design is also generally simpler, although testing generally requires a full size test rig. Most modern turbine engines use annular combustors. Likewise, most combustor research and development focuses on improving this type of design.

One variation on the standard annular combustor is the double annular combustor (DAC). Like an annular combustor, the DAC is a continuous ring without separate combustion zones around the radius. The difference is that the combustor has two combustion zones around the ring—a pilot zone and a main zone. The pilot zone acts like that of a single annular combustor, and is the only zone operating at low power levels. At high power levels, the main zone is used as well, increasing air and mass flow through the combustor. Such designs may have reduced nitrous oxide and $CO_2$ emissions. In still other variations, triple annular and "multiple annular" combustors with any number of rings may be implemented and used. In such designs, multiple ring-shaped heat exchangers may be used in some embodiments.

FIG. 9B illustrates can burners 910 as looking towards the turbine nozzle, as known in the art. Can combustors are self-contained cylindrical combustion chambers. Each "can" 912 has its own fuel injector 914, igniter (not shown), liner, and casing. The primary air from the compressor is guided into each individual can, where it is decelerated, mixed with fuel, and then ignited. The secondary air also comes from the compressor, where it is fed outside of the liner (inside of which is where the combustion is taking place). The secondary air is then fed, usually through slits in the liner, into the combustion zone to cool the liner via thin film cooling.

In most applications, multiple cans such as 912 are arranged around the central axis of the engine, and their shared exhaust is fed to the high pressure turbine. Can-type combustors were most widely used in early gas turbine engines, owing to their ease of design and testing (one can test a single can, rather than having to test the whole system). Can-type combustors are easy to maintain, as only a single can needs to be removed, rather than the whole combustion section. Most modern gas turbine engines (particularly for aircraft applications) do not use can combustors, as they often weigh more than alternatives such as annular designs. Additionally, the pressure drop across can 912 is generally higher than other combustors (on the order of 7%). Most modern engines that use can combustors are turbo shafts.

FIG. 9C illustrates cannular burners 920 as looking towards the turbine nozzle, as known in the art. Like the can-type combustor, cannular combustors have discrete combustion zones (or "cans" 924) contained in separate liners with their own fuel injectors 926. Unlike the can combustor, all the combustion zones share a common ring (annulus) casing 922. Each combustion zone no longer has to serve as a pressure vessel. The combustion zones can also "communicate" with each other via liner holes or connecting tubes that allow some air to flow circumferentially.

The exit flow from the cannular combustor generally has a more uniform temperature profile, which is better for the turbine section. It also eliminates the need for each chamber to have its own igniter. Once the fire is lit in one or two cans, it can easily spread to, and ignite, the other cans. This type of combustor is also generally lighter than the can-type combustor, and has a lower pressure drop (on the order of 6%). However, a cannular combustor can be more difficult to maintain than a can combustor. Heat exchangers such as heat exchanger 500 of FIG. 5 may be particularly well suited for use in can and cannular designs.

FIG. 10 illustrates a ring heat exchanger 1000, according to an embodiment of the present invention. Ring heat exchanger 1000 may be particularly well-suited for use with annular turbine engine designs. Ring heat exchanger 1000 has a spiral pattern in FIG. 10, but any desired shape may be used. Similar to the heat exchangers discussed above, ring heat exchanger 1000 may contain a thermal transfer medium such as PocoFoam®, and may be connected via thermal transfer medium-filled pipes, or any other suitable connection mechanism, to a manifold.

Figure 11A:
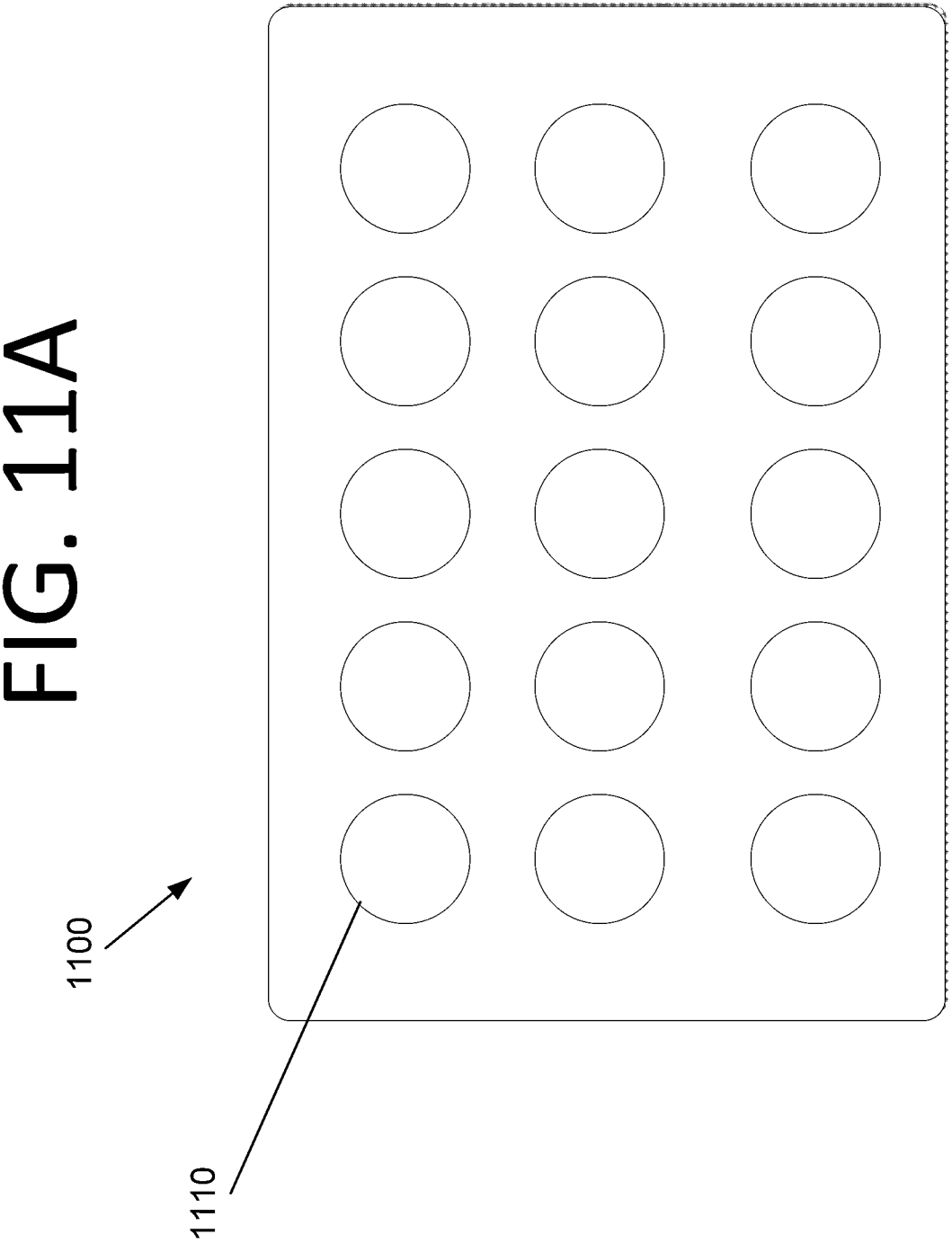
FIG. 11A illustrates a front view of a heat exchanger, according to an embodiment of the present invention.

FIG. 11A illustrates a front view of a heat exchanger 1100, according to an embodiment of the present invention. Heat exchanger 1100 has multiple pipes 1110 that appear as holes from this view. The pipes may be of any size, shape, or pattern, as a matter of design choice. For instance, in some embodiments, the heat exchanger may be rounded to better conform to the shape of a can. However, it should be noted that embodiments such as that of FIGS. 11A and B may have inferior performance to many spiral embodiments. Generally speaking, the higher the surface area and the better the shape of a heat exchanger conforms to air flow, the more effective the system is likely to be.

Figure 11B:
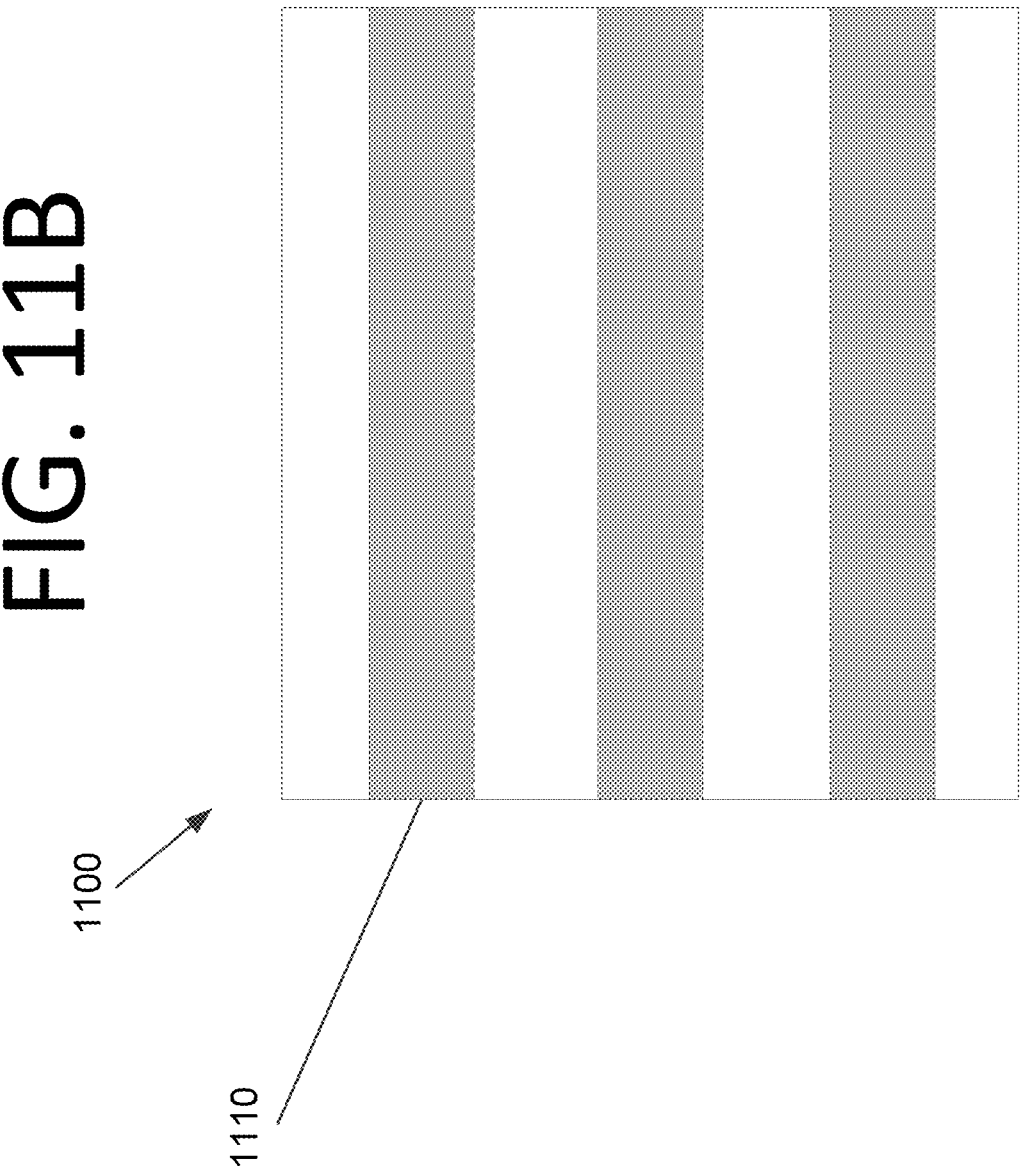
FIG. 11B illustrates a side view of the heat exchanger, according to an embodiment of the present invention.

FIG. 11B illustrates a side view of the heat exchanger 1100, according to an embodiment of the present invention. Here, pipes 1110 have a straight path. However, the pipes may take any path desired through heat exchanger 1100 in some embodiments. Further, the individual paths of each pipe may be different in some embodiments.

Figure 12:
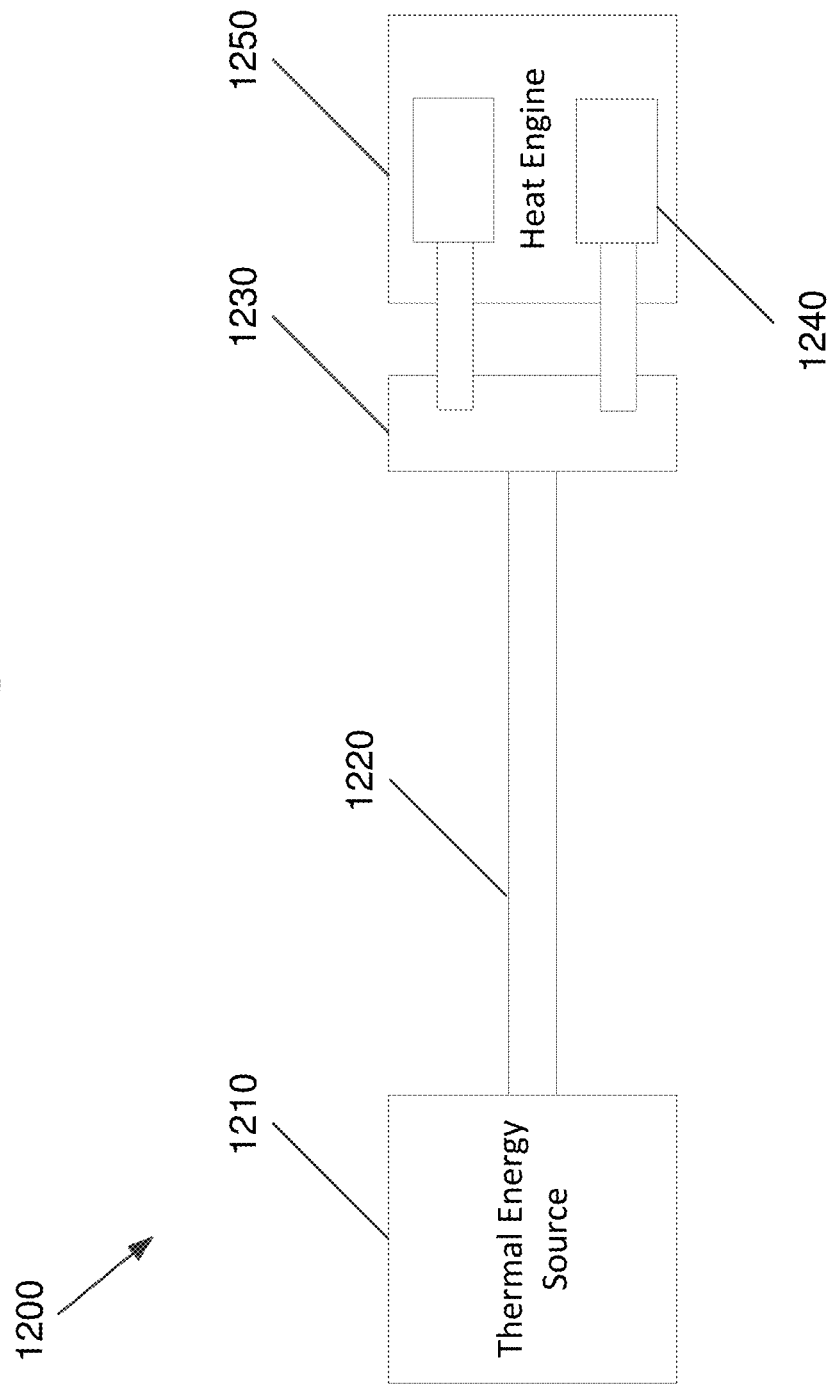
FIG. 12 illustrates a system for powering a heat engine using thermal energy, according to an embodiment of the present invention.

FIG. 12 illustrates a system 1200 for powering a heat engine using thermal energy, according to an embodiment of the present invention. System 1200 includes a thermal energy source 1210. In some embodiments, the thermal energy source may be from a thermal storage unit, a solar thermal collector, exhaust from a coal-fired power plant or other industrial combustion operation, heat extracted from processing molten materials, or any other suitable source of thermal energy as would be understood by one of ordinary skill in the art. Thermal energy source 1210 is connected to a manifold 1230 via a thermal transfer pipe 1220 filled with a thermal transfer medium such as PocoFoam®. Heat may be transferred from thermal energy source 1210 to thermal transfer pipe 1220 via one or more proximity heat exchangers (not shown).

Manifold 1230 is connected to pipes of multiple heat exchangers 1240. Heat travels through a thermal transfer medium within the pipes to the heat exchangers, which may also contain at least some amount of a thermal transfer medium. Heat exchangers 1240 extend into a combustion chamber of heat engine 1250 and heat air fed into the combustor from a compressor. The heated gases then contact and rotate turbines of the heat engine before exiting from a nozzle. Power generated by the heat engine can be used for any suitable application, such as generating electricity, powering aircraft, etc.

Thermodynamics

The general thermodynamics of a gas turbine do not change with the use of embodiments of the present invention. Very basically, the core operating mechanism behind a heat engine is the rotation of turbines via the rapid expansion and motion of hot, compressed gas. Gases can be studied by considering the small scale action of individual molecules or by considering the large scale action of the gas as a whole. The large scale action of the gases can be directly measured. However, to study the action of the molecules, a theoretical model must be used. The model, called the kinetic theory of gases, assumes that the molecules themselves are very small relative to the distance between each molecule. The molecules are in constant, random motion and frequently collide with each other and with the walls of any container.

The individual molecules possess the standard physical properties of mass, momentum, and energy. The density of a gas is simply the sum of the mass of the molecules divided by the volume which the gas occupies. The pressure of a gas is a measure of the linear momentum of the molecules. As the gas molecules collide with the walls of a container, the molecules impart momentum to the walls, producing a force that can be measured. The force divided by the area is defined as the pressure. The temperature of a gas is a measure of the mean kinetic energy of the gas. Thus, the hotter the gas, the more energy it contains. The molecules are in constant random motion, and there is an energy (mass times the square of the velocity, or $mv^2$) associated with that motion. The higher the temperature of the gas, the faster the motion of the molecules in the gas. This physics in not dependent on the method of delivering the thermal energy, and thermal energy can be delivered via any practical means, whether a combustion-based, or a non-combustion-based system.

In a solid, the location of the molecules relative to one another remains almost constant. However, in a gas, the molecules can move around and interact with one another and with their surroundings in different ways. As mentioned above, there is always a random component to molecular motion. The entire fluid can be made to move as well in an ordered motion, or flow. The ordered motion is superimposed, or added to, the normal random motion of the molecules. At the molecular level, there is no distinction between the random component and the ordered component. The pressure produced by the random component can be measured as the static pressure. The pressure produced by the ordered motion is called dynamic pressure. Bernoulli's equation indicates that the sum of the static and dynamic pressure is the total pressure, which can also be measured.

For a gas, the heat transfer is related to a change in temperature. The temperature, pressure, and volume of the gas determine its state. Heating a gas changes the state of the gas. However, the state of a gas can be changed in a wide variety of ways. The amount of work that a gas can do depends on both the initial and final states and on the process used to make the change. In the same way, the amount of heat transferred in changing the state of a gas also depends on the initial and final states and the exact process used to change the state. Different processes result in different amounts of heat transfer and work.

Emissions

The primary pollutants from gas turbine engines are nitrogen oxides (NOX), carbon monoxide (CO), and, to a lesser extent, volatile organic compounds (VOC). Particulate matter (PM) is also a primary pollutant for gas turbines using liquid fuels. NOX formation is strongly dependent on the high temperatures developed in the combustor. CO, VOC, hazardous air pollutants (HAP), and PM are primarily the result of incomplete combustion. Trace to low amounts of HAP and sulfur dioxide ($SO_2$) are emitted from gas turbines. Ash and metallic additives in the fuel may also contribute to PM in the exhaust. Oxides of sulfur (SOX) will generally only appear in a significant quantity if heavy oils are fired.

Embodiments of the present invention may be used to either supplement, or completely replace, combustible fuel sources for a heat engine. Thus, embodiments of the present invention may either be completely clean, or decrease the pollutants produced by a fuel-burning heat engine. In the latter case, the emission reduction occurs for two reasons. First, less energy is required from the burned source in a hybrid system in order to produce the same amount of power, so less fuel is required. Second, the heat in the system can be increased, causing the heat engine to burn its fuel more completely and efficiently.

Further, power output from combustion-driven turbines is affected by ambient conditions, such as inlet humidity, temperature, and pressure. Variations of emissions of 30% or greater may be seen in some cases due to changes in ambient temperature and humidity alone. Systems powered by direct thermal energy are not prone to these drawbacks. Embodiments of the present invention also have the advantage of not needing as much maintenance due to decrease in, or the complete absence of, residues from combustible fuel sources.

Some embodiments of the present invention use a heat exchanger in a combustion chamber or burner of a Brayton cycle heat engine to either drive the engine as the sole source of energy, or to provide supplemental energy from other source such as combustion. The heat exchanger may have various shapes and configurations, although some embodiments having a spiral shape may have superior performance. At least part of the heat exchanger may contain a thermal transfer medium, such as PocoFoam®, to deliver heat to the heat engine.

The heat exchanger may be connected by pipes or another suitable mechanism containing a thermal transfer medium to a manifold. The manifold may also be filled with a thermal transfer medium and may, in turn, be operably connected to an external thermal energy source. Embodiments of the present invention may be designed for use with any type of heat engine, and may offer a clean power generation solution that also require reduce amounts of maintenance as compared with traditional gas turbines.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
   a compressor;
   a combustion chamber;
   a turbine;
   a heat exchanger positioned at least partially within the combustion chamber; and
   a heat exchanger pipe operably connected to the heat exchanger, wherein
   the heat exchanger is configured to deliver thermal energy to the combustion chamber from an external source, heating air entering the combustion chamber from the compressor,
   the air exits the combustion chamber and drives the turbine,
   the heat exchanger pipe comprises a solid state thermal transfer medium configured to deliver thermal energy to the heat exchanger, and
   a core of the heat exchanger comprises boron nitride nanosphere packing, allowing sufficient clearance for contraction and expansion of a cover of the heat exchanger without losing thermal conductivity.

2. The apparatus of claim 1, wherein the heat exchanger comprises a second thermal transfer medium configured to transfer heat to the heat exchanger from the external source.

3. The apparatus of claim 1, wherein the heat exchanger is configured in a spiral shape, a ring shape, or both.

4. The apparatus of claim 1, further comprising: a manifold operably connected to the heat exchanger pipe, wherein the manifold comprises a second thermal transfer medium.

5. The apparatus of claim 4, further comprising: a thermal transfer pipe operably connecting the manifold to the thermal energy source, wherein the thermal transfer pipe comprises a third thermal transfer medium.

6. The apparatus of claim 1, wherein the heat exchanger is configured to fit within an annular combustor, a multi-annular combustor, a can combustor, or a cannular combustor.

7. The apparatus of claim 1, wherein the cover of the heat exchanger comprises nickel.

8. A Brayton cycle heat engine, comprising:
   a compressor;
   a burner configured to receive compressed air from the compressor;
   a turbine configured to receive hot air from the burner;
   a heat exchanger at least partially inserted into the burner; and
   a heat exchanger pipe operably connected to the heat exchanger, wherein
   the heat exchanger is configured to heat air within the combustion chamber either alone or supplemental to a combustion-based heat source,
   the heat exchanger pipe comprises a solid state thermal transfer medium configured to deliver thermal energy to the heat exchanger, and
   a core of the heat exchanger comprises boron nitride nanosphere packing, allowing sufficient clearance for contraction and expansion of a cover of the heat exchanger without losing thermal conductivity.

9. The Brayton cycle heat engine of claim 8, wherein the heat exchanger comprises a second thermal transfer medium configured to transfer heat to the heat exchanger from the external source.

10. The Brayton cycle heat engine of claim 8, wherein the heat exchanger is configured in a spiral shape, a ring shape, or both.

11. The Brayton cycle heat engine of claim 8, further comprising: a manifold operably connected to the heat exchanger pipe, wherein the manifold comprises a second thermal transfer medium.

12. The Brayton cycle heat engine of claim 11, further comprising: a thermal transfer pipe operably connecting the manifold to a thermal energy source, wherein the thermal transfer pipe comprises a third thermal transfer medium.

13. The Brayton cycle heat engine of claim 8, wherein the heat exchanger is configured to fit within an annular combustor, a multi-annular combustor, a can combustor, or a cannular combustor.

14. The Brayton cycle heat engine of claim 8, wherein the cover of the heat exchanger comprises nickel.

15. A system, comprising:
    a thermal energy source configured to generate thermal energy either directly or as a byproduct of another process;
    a thermal transfer pipe comprising a solid state thermal transfer medium;
    a manifold comprising a solid state thermal transfer medium, the manifold operably connected to the thermal transfer pipe;
    a heat exchanger pipe comprising a solid state thermal transfer medium operably connected to the manifold; and
    a heat exchanger comprising a solid state thermal transfer medium operably connected to the heat exchanger pipe, wherein
    the heat exchanger is at least partially contained within a combustion chamber of a heat engine,
    the heat exchanger is configured to provide sufficient heat to either power the heat engine alone, or supplement power provided by a combustible fuel source, and
    a core of the heat exchanger comprises boron nitride nanosphere packing, allowing sufficient clearance for contraction and expansion of a cover of the heat exchanger without losing thermal conductivity.

16. The system of claim 15, wherein the heat exchanger is configured in a spiral shape, a ring shape, or both.

17. The system of claim 15, wherein the heat exchanger is configured to fit within an annular combustor, a multi-annular combustor, a can combustor, or a cannular combustor.

18. The apparatus of claim 15, wherein the cover of the heat exchanger comprises nickel.

* * * * *